(12) United States Patent
Diemunsch

(10) Patent No.: US 7,172,147 B2
(45) Date of Patent: Feb. 6, 2007

(54) MODULAR BLADE ASSEMBLY WITH ALIGNMENT MEANS

(75) Inventor: Mark T. Diemunsch, Stockton, CA (US)

(73) Assignee: Barclay Roto-Shred Incorporated, Stockton, CA (US)

( * ) Notice: Subject to any disclaimer, the term of this patent is extended or adjusted under 35 U.S.C. 154(b) by 65 days.

(21) Appl. No.: 10/882,565

(22) Filed: Jul. 1, 2004

(65) Prior Publication Data

US 2006/0086854 A1   Apr. 27, 2006

(51) Int. Cl.
*B02C 7/12* (2006.01)
(52) U.S. Cl. ...................... 241/236; 241/295
(58) Field of Classification Search ............... 241/236, 241/294, 295
See application file for complete search history.

(56) References Cited

U.S. PATENT DOCUMENTS

| | | | |
|---|---|---|---|
| 4,776,249 A | | 10/1988 | Barclay |
| 4,854,508 A | | 8/1989 | Dicky |
| 4,901,929 A | | 2/1990 | Barclay |
| 5,730,375 A | * | 3/1998 | Cranfill et al. .............. 241/243 |
| 6,343,755 B1 | | 2/2002 | Barclay et al. |
| 6,640,853 B1 | * | 11/2003 | Sun ............................ 144/218 |
| 2004/0000606 A1 | | 1/2004 | Diemunsch |

* cited by examiner

*Primary Examiner*—Faye Francis
(74) *Attorney, Agent, or Firm*—Schneck & Schneck; Thomas Schneck

(57) ABSTRACT

A modular blade assembly having base and blade components and at least one keyplate aligning the base and blade components. The keyplate rests in a recessed groove in each of the base and blade components. Each of the dimensions of the recessed groove in which the keyplate rests is less than the dimensions of the surface in which the groove is disposed.

11 Claims, 6 Drawing Sheets

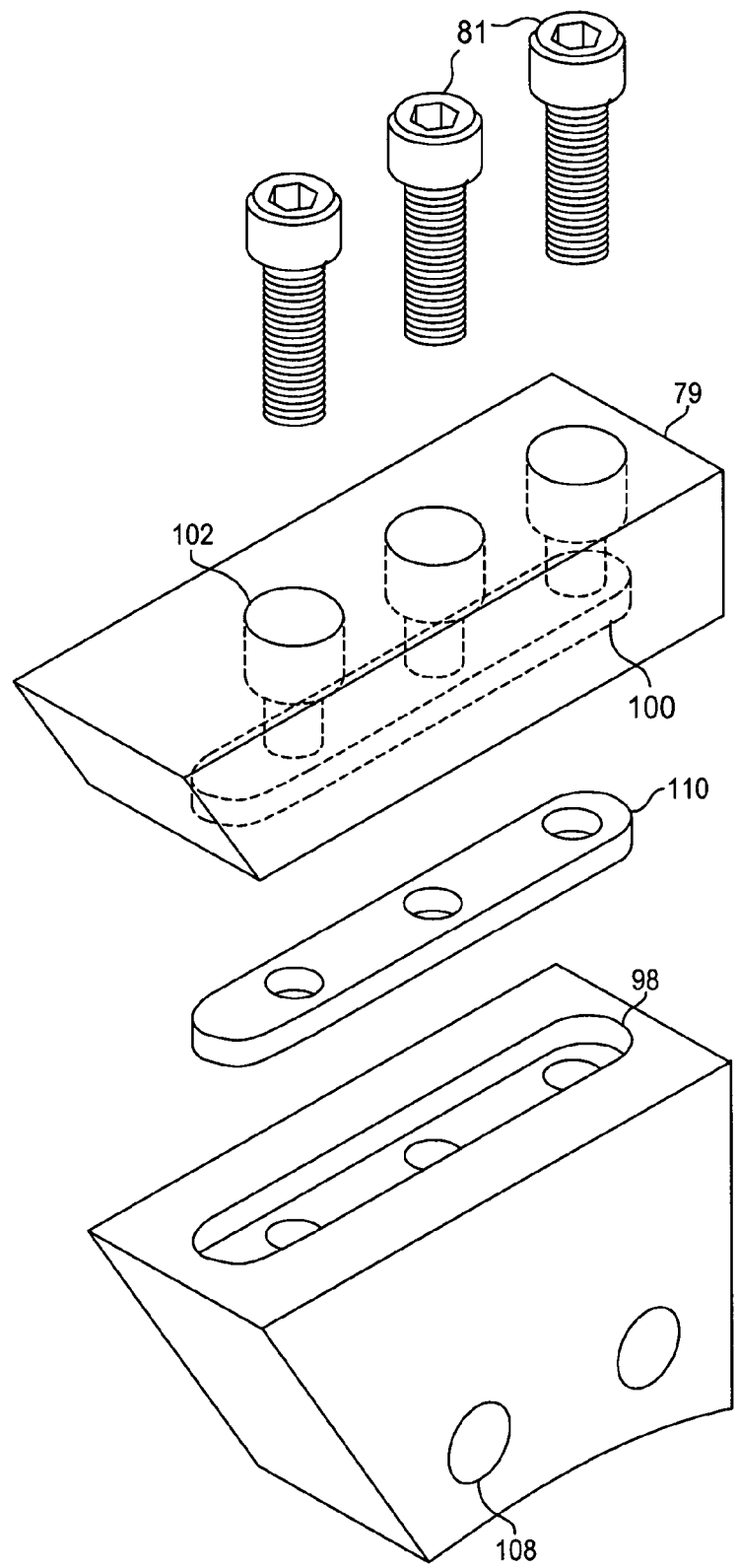
Fig._4

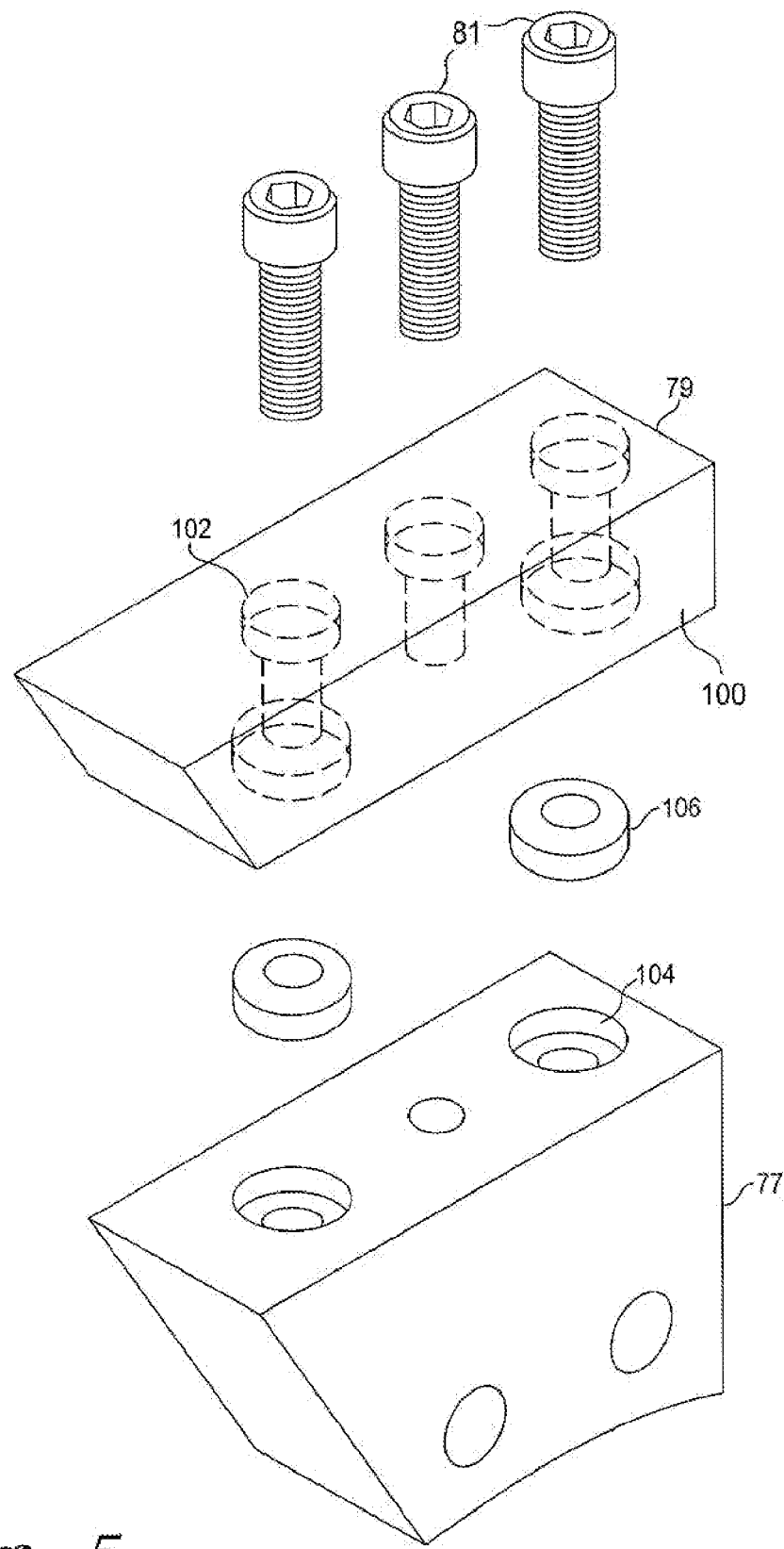
Fig._5

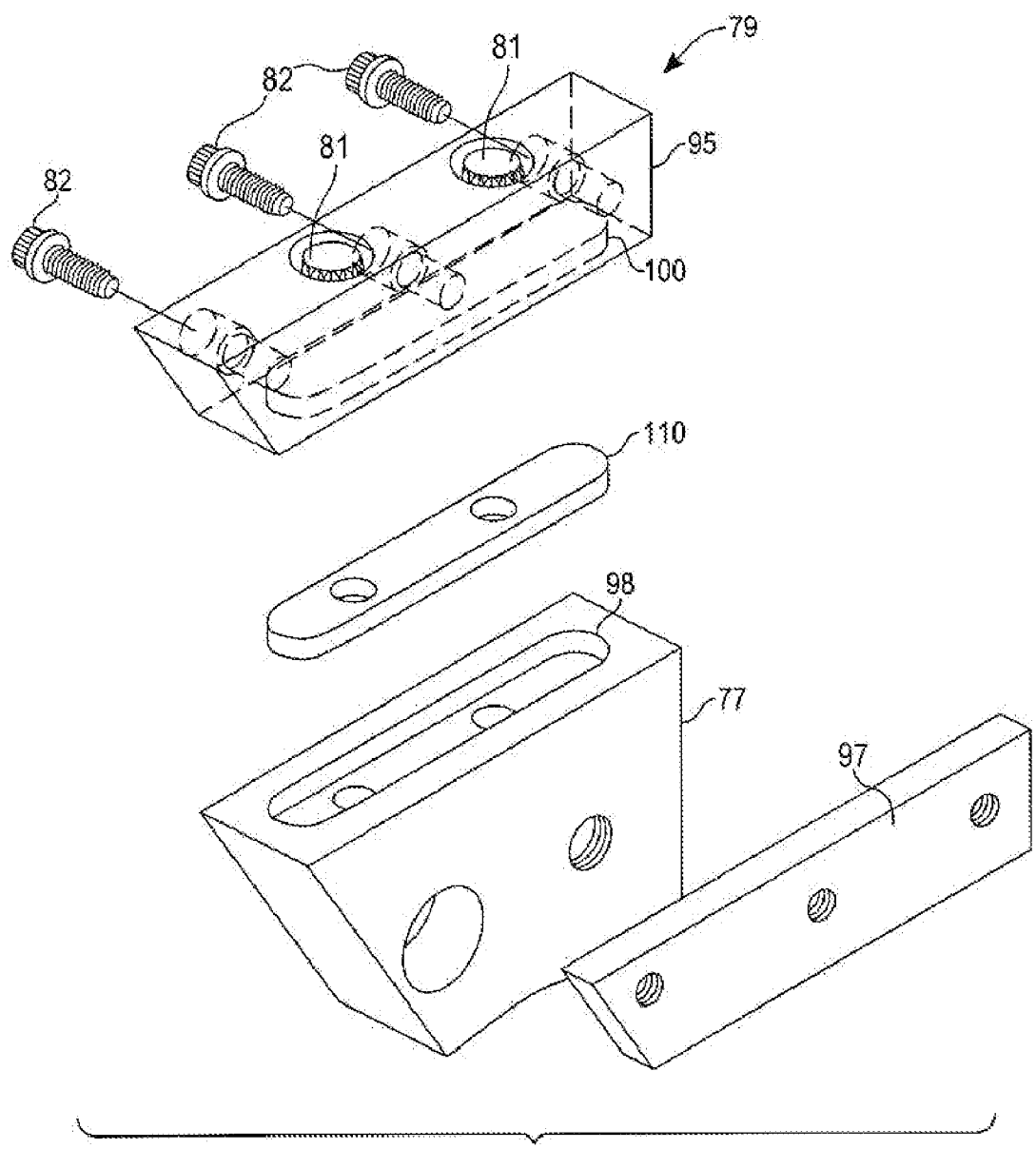
Fig._6

MODULAR BLADE ASSEMBLY WITH ALIGNMENT MEANS

TECHNICAL FIELD

The invention relates to modular blade assemblies, in particular modular blade assemblies with alignment means.

BACKGROUND OF THE INVENTION

Tire shredding machines are used to reduce tires, particularly automotive tires, to small pieces of rubber which can be reused in manufacturing a variety of products. With reference to FIG. 1, a typical tire reduction system of the prior art is seen, as described in U.S. Pat. No. 6,343,755 to Barclay and Diemunsch. A continuous feed of tires 15, is placed on conveyor belt 10 for motion toward the primary rotary shearing assembly 11. A toothed feeder wheel 13 seizes tires from the conveyor belt and pushes them into the primary shearing assembly 11 for digestion. The primary shearing assembly, relying on the rotary shears 17 and 19, reduces full tires to several 42 inch strips 21, depending on the number of rotary shears, each of which is typically 6 inches wide at the shearing blade, such that at least 6 shearing wheels plus spacers would be needed to span the diameter of an average tire. A second conveyor belt 20 moves the tires to secondary shearing assembly 23. Here, a pair of secondary rotary shears 26 and 28, mounted within box 27, held by support rails 29, receives the various length strips from bin 25. The secondary shearing assembly 23 reduces the pieces 32, falling onto conveyor belt 30, typically ranging in size between 1.5 inches and 4 inches. Electric motor 31 provides the force for driving the primary and secondary shears simultaneously in tandem.

In FIG. 2, detailed operation of primary shearing wheels of a rotary shearing assembly of FIG. 1 is seen. A first shearing wheel 17 is shown meshing with a second shearing wheel 19. Each shearing wheel is mounted on a drive shaft and has shearing members 33 mounted adjacent to an annular non-unitary spacer 35, separating the cutter assembly from an adjacent cutter assembly. The annular spacer may be segmented and is driven by a drive shaft or hub by key members 37. Bolts joining the annular spacer to the cutter assembly allow the shearing members to be individually removed from each shearing wheel for resharpening, following the teachings of U.S. Pat. No. 4,901,929 to R. Barclay. First and second sets of shearing assemblies mounted on respective shafts in interleaving relationship act as rotary shears for tires fed between the assemblies in the direction of arrow A. The stripper rolls 41 and 43 clear the spaces between spaced apart shearing members of each shearing wheel 17 and 19. Arcuate steel segments 45 and 47 in each roll are side mounted to a separate annular member 49 for ease of maintenance as described in U.S. Pat. No. 4,776,249 to R. Barclay.

With reference to FIG. 3, a rotary shear 51, described in U.S. patent application Ser. No. 10/185,500, filed Jun. 27, 2002, of a primary shredder is shown to have a cutting wheel with cutting assemblies 53 and 55 mounted on a hub 63 having a central longitudinal axis 57 with which the cutting wheels are concentric. Hub 63 rotates about axis 57. Between the cutting assemblies is a core 61 which serves as a spacer between cutting assemblies 53 and 55. The periphery of the spacer is smooth and is slightly recessed compared to the periphery of the cutting wheels. The cutting assemblies have a serrated circumferential profile which arises from segments 71 which are pie-piece shaped, except that the segments slightly overlap each other, creating a serrated profile. Each segment has a base 77 with a blade 79 atop the base and circumferentially aligned with the base by means of a linear keyplate 74, running the length of base 77 and blade 79, encapsulated between the base 77 and the blade 79. By aligning the base 77 and blade 79, the keyplate 74 allows a blade to be used on two side and also serves to keep blades from sliding. Radially extending bolts 81 hold the blade 79 to base 77 while axial bolts 83 hold the pie-piece segment to the core 61. An end plate 80 may be seen at one end of hub 63. Although not shown, the end plate is preferably equipped with peripheral blades for engaging an adjacent shearing wheel in a shearing relationship. All axial bolts are secured to the end plate. There are sufficient rotary shears on each hub to span the width of a tire.

Part of the maintenance routine for a tire shredding machine requires replacing worn blades on the cutting wheels. This needs to be done as quickly as possible so that the machinery can resume operation. In addition, discrete pieces of the blades (the base of the blade, the cutting blade, etc.) may require replacement while the rest of the blade is still usable. Modular blade assemblies, similar to those discussed in FIG. 3, above, which have base and blade components which are fastened together, are used to enable quick and efficient repair.

The keyplate of the modular blade assembly is made of softer metal than the base or blade. This could potentially weaken the modular blade assembly since the keyplate described in FIG. 3 extends the width of the top of the base and the bottom of the blade and therefore is subject to stresses which could damage the keyplate, requiring it to be replaced. It would be advantageous to have a modular blade assembly which is less susceptible to damage and easy to manufacture.

SUMMARY OF THE INVENTION

These needs have been met by a modular blade assembly having a base and blade component with at least one keyplate, each of whose dimensions are less than those of both the base and blade components, aligning the base and blade components. The keyplate rests in a grooved recess in both the base and blade components of a modular blade assembly. Each of the dimensions of the grooved recess is less than the dimensions of the surface of both the base and blade components in which the recess is disposed. In one embodiment, the keyplate is a single piece; in another embodiment, there are at least two keyplates.

Since the keyplate is surrounded on all sides by the base and blade components, the modular blade assembly is strong and the keyplate is not as susceptible to damage as it would be if some of its surfaces were exposed. In addition, both the keyplate and the recesses in the base and blade components of the modular blade assembly in which the keyplate rests are relatively easy to manufacture so the increased strength of blade assembly does not require a major overhaul of the manufacturing process.

DESCRIPTION OF THE DRAWINGS

FIG. 4 is an exploded view of a modular blade assembly with a keyplate of the present invention.

FIG. 5 is an exploded view of a modular blade assembly with two keyplates in accordance with the present invention.

FIG. 6 is an alternate embodiment of a modular blade assembly having a two-piece blade in accordance with the present invention.

DETAILED DESCRIPTION OF THE INVENTION

Figure 1:
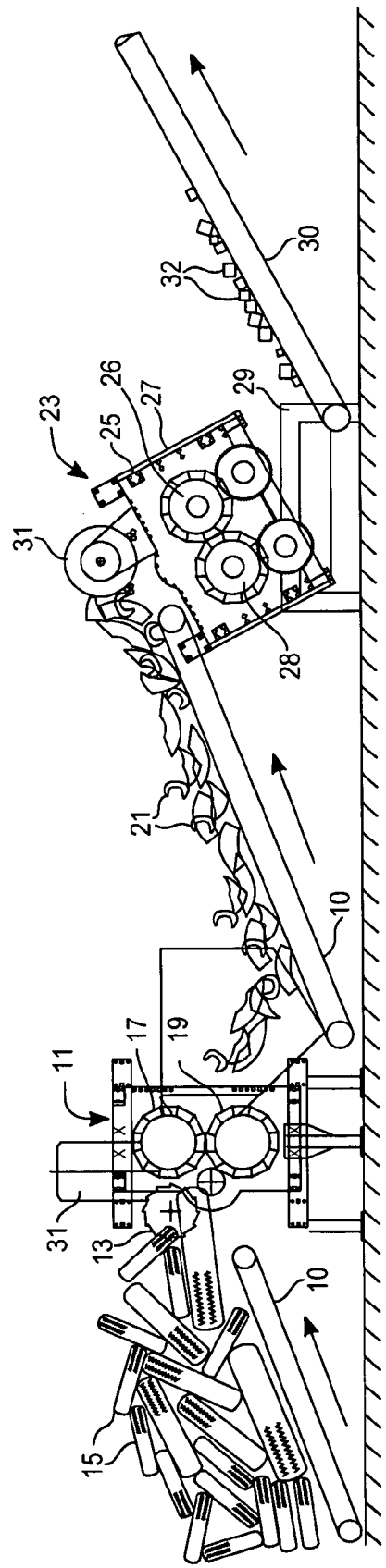
FIG. 1 is a side elevational view of typical tire shredding machinery of the prior art.
Figure 2:
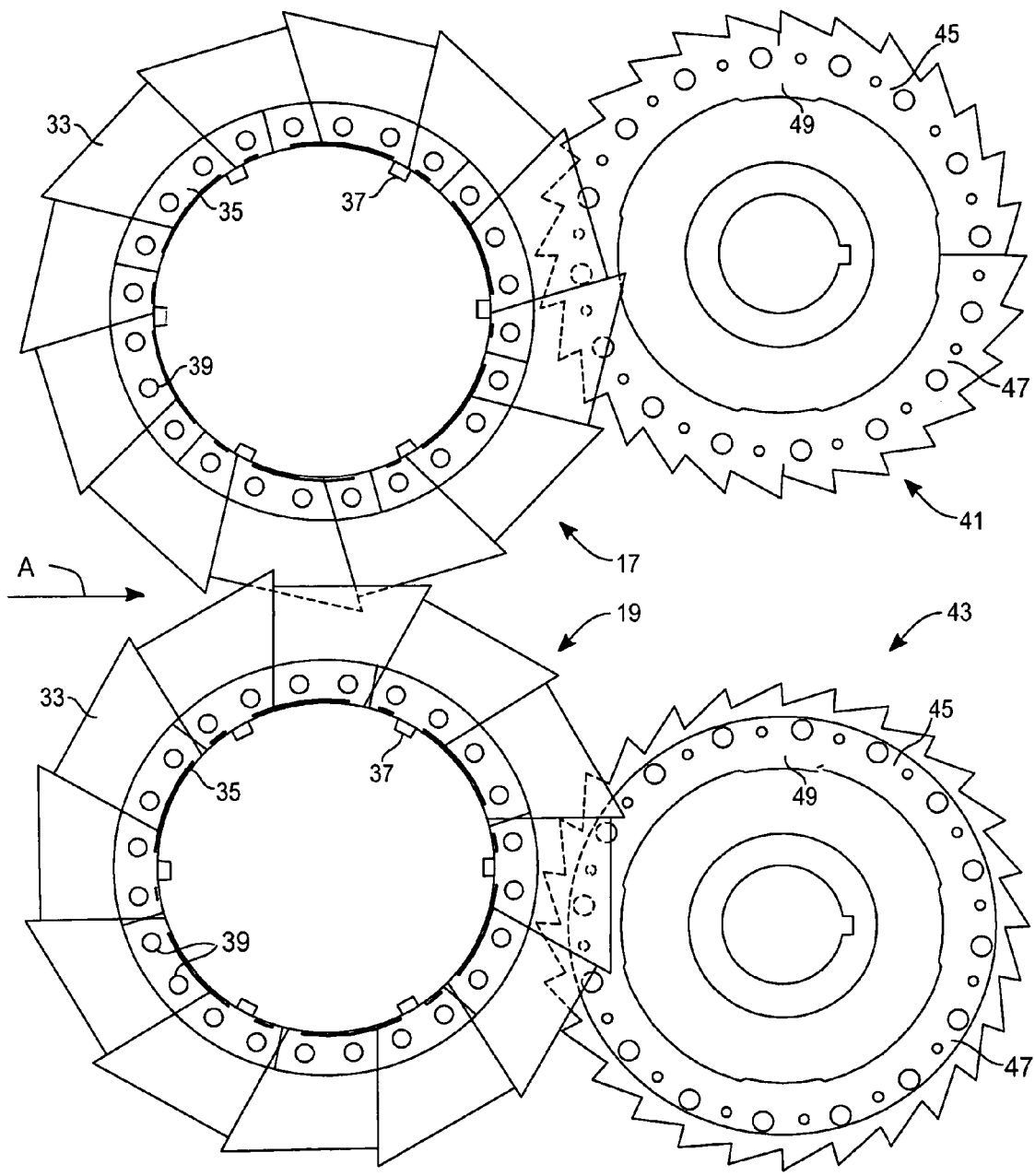
FIG. 2 is a side plan view of a pair of intermeshing, adjacent cutter wheels of a primary tire shredder, in an operative tire shearing relation, as found in the prior art, with a pair of stripper rolls of the prior art positioned for removing tire comminution debris from spaces between adjacent cutter wheels.
Figure 3:
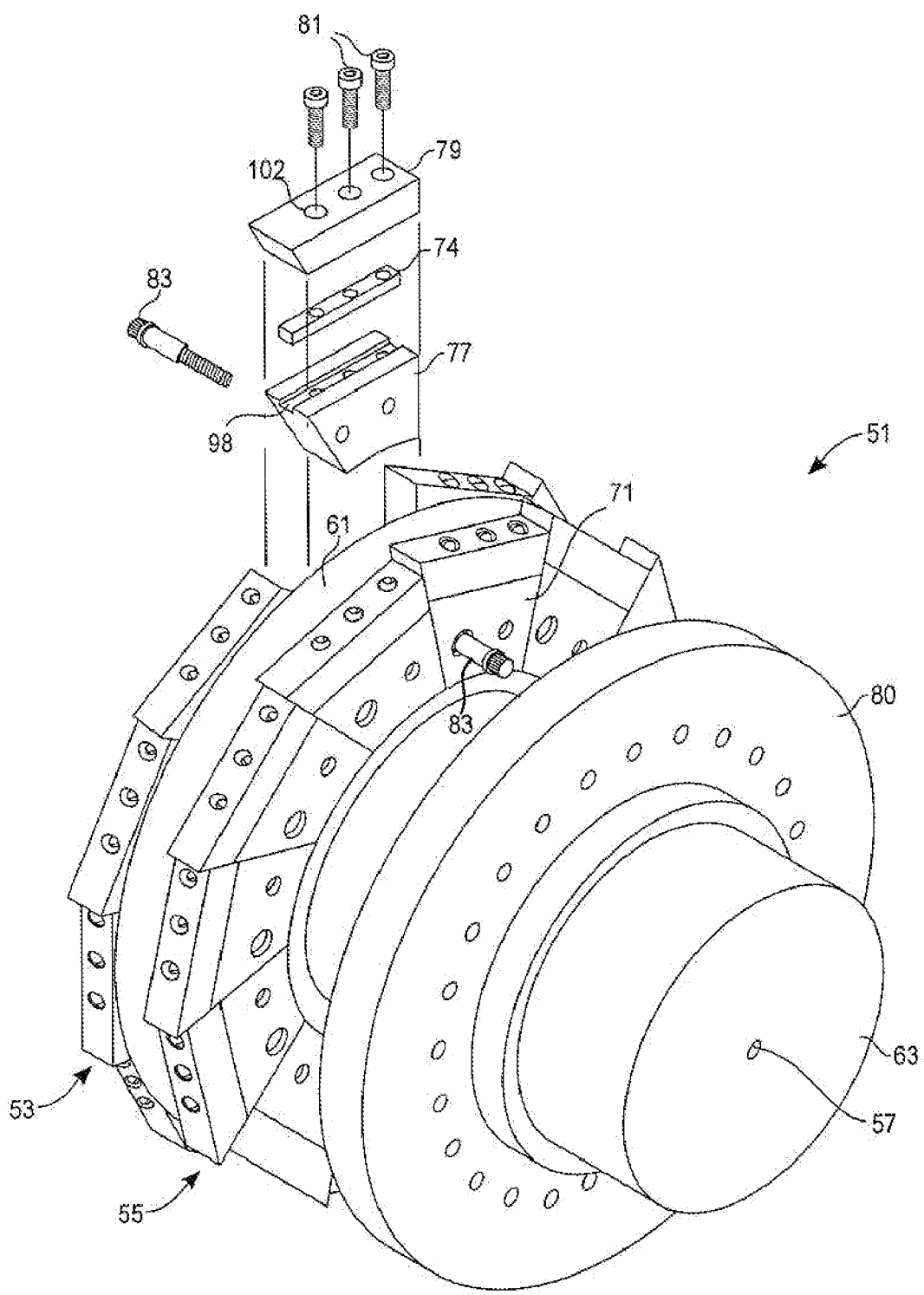
FIG. 3 is an exploded perspective view of a single cutting assembly of a primary shredder of the prior art.

In FIG. 4, the strengthened modular blade assembly includes a base 77, a blade 79, and a keyplate 110. The keyplate 110 aligns the base 77 and blade 79, allowing a blade to be used on two sides and also serving to keep blades 79 from sliding. (In this embodiment, the keyplate 110 is oblong but it may be any other shape, for instance, circular or rectangular, in other embodiments.) The base 77 and the blade 79 both have recesses 98 and 100 in which the keyplate 110 rests. Each of the dimensions of the grooves 98, 100 in which the keyplate 110 rests is less than the dimensions of the surface in which the groove 98, 100 is disposed. Bolts 81 fasten the base 77, keyplate 74, and blade 79 together. (In other embodiments, other fastening means may be used.) The bolts 81 are inserted into predrilled holes 102, are level with or below the top surface of the blade 79 (however, in other embodiments, the heads of the bolts may extend above the top surface of the blade). The modular blade assembly is attached to a cutting wheel by axially extending bolts inserted into predrilled holes 108. (in other embodiments, other methods for attaching the modular blade assembly to the cutting wheel may be employed.)

In FIG. 5, there are two keyplates 106 rather than one. Any number of keyplates may be used and, as shown here, not all bolts 81 need to extend through the keyplates 106—other bolts 81 may directly attach the blade 79 and the base 77.

Blade bases 77 are made of heat-treated D-2 tool steel. Similarly, the blade members 79 are also heat-treated D-2 tool steel. Keyplates 106 are made of mild tool steel and are sized to closely fit partially within recess 104 and partially within the corresponding recess in the blade member 79. Blade dimensions can vary to produce different size cuts.

In FIG. 6, it is seen that each blade is split, with an inwardly facing blade member 95 which is mounted against the central portion of a core and an outwardly facing blade member 97 distal from the core, compared to blade member 95. The thickness of the outwardly facing member is less than half of the thickness of the inwardly facing blade member. Preferably, the overall thickness of the entire blade is 1.5 inches, while the thickness of the outwardly facing blade member 97 is $3/8$ inches, but these values are variable and not critical. The outwardly facing blade member 97 is made of D-2 tool steel and since blade member 97 experiences the most wear, it is easily replaceable. To replace the outwardly facing blade member 97, the entire blade 79 must be removed by first removing radial bolts 81. Once these are removed, the axial bolts 82 may be removed, thereby releasing the outwardly facing blade member 97. Bolts 81 have heads 82 that are recessed into the inwardly facing blade member 95 (though the bolt heads 82 may not be recessed in other embodiments). In addition to aligning the base 77 and blade members 95, 97, keyplate 110 may be used to help support the inwardly facing segment 95.

The ability to change the outwardly facing blade member, i.e. a fraction of the mass of the entire blade member 79, is a substantial cost savings considering the number of blades which are employed. An outwardly facing blade member is preferably made of a tougher, but more expensive material, usually a grade of tool steel, such as D2. The inwardly facing blade member may be a less tough and inexpensive material. Eventually, the inwardly facing blade member 95, as well as the replaceable base 77 will need to be refinished or replaced. However, greatest wear is on the exposed outwardly facing blade member which needs refinishing or replacement more frequently.

What is claimed is:

1. A modular blade assembly for a cutter wheel comprising:
    a) a base mountable to the cutter wheel with at least one first recess in a surface of the base, each dimension of the at least one first recess measuring less than each corresponding dimension of the surface of the base in which the at least one first recess is disposed, a surface of the first recess having at least one first opening extending through at least a portion of the base for receiving a fastening means;
    b) a blade member with at least one second recess in a surface of the blade member, each dimension of the at least one second recess measuring less than each corresponding dimension of the surface of the blade member in which the at least one second recess is disposed, a surface of the second recess having at least one second opening extending through the blade member for receiving a fastening means;
    c) at least one aligning means intermediating between the base and the blade member, the at least one aligning means disposed in the at least one first recess and the at least one second recess and having at least one third opening for receiving a fastening means; and
    d) at least one fastening means for connecting the base, blade member, and the aligning means to form the modular blade assembly, one or more of the at least one fastening means extending through at least a portion of the base, the blade member, and the at least one aligning means via:
    the at least one first opening extending through at least a portion of the base;
    the at least one second opening extending through the blade member; and
    the at least one third opening located in the at least one aligning means.

2. The modular blade assembly of claim 1 further comprising a means for attaching the base to the cutter wheel.

3. The modular blade assembly of claim 2 wherein the cutter wheel is attached to a rotary shear member.

4. The modular blade assembly of claim 1 wherein each of the openings for receiving the fastening means is threaded.

5. The modular blade assembly of claim 1 wherein the blade member is made of two segments.

6. The modular blade assembly of claim 5 wherein a thickness of a first blade segment is less than half of the thickness of a second blade segment.

7. The modular blade assembly of claim 5 wherein the two segments are joined together by a second fastening means.

8. In a modular blade assembly for a cutter wheel of the kind having a base and a blade fastened together the improvement comprising an aligning means intermediating between the base and the blade, wherein the aligning means is disposed in a first recess in a surface of the base, each dimension of the first recess measuring less than each corresponding dimension of the surface in which the first recess is disposed, and a second recess in a surface of the blade, each dimension of the second recess measuring less than each corresponding dimension of the surface in which the second recess is disposed, the blade, base, and aligning means secured in place by bolts extending into and through the blade, the aligning means and into the base such that the aligning means is enclosed by the recess formed from the first recess and the second recess.

9. The improvement of claim 8 wherein the at least one aligning means is a circular disk.

10. In a modular blade assembly for a cutter wheel of the kind having a base and a blade fastened together the improvement comprising an oblong aligning means intermediating between the base and the blade, wherein the aligning means is disposed in a first recess in a surface of the base, each dimension of the first recess measuring less than each corresponding dimension of the surface in which the first recess is disposed, and a second recess in a surface of the blade, each dimension of the second recess measuring less than each corresponding dimension of the surface in which the second recess is disposed.

11. In a modular blade assembly for a cutter wheel of the kind having a base and a blade fastened together the improvement comprising a rectangular aligning means intermediating between the base and the blade, wherein the aligning means is disposed in a first recess in a surface of the base, each dimension of the first recess measuring less than each corresponding dimension of the surface in which the first recess is disposed, and a second recess in a surface of the blade, each dimension of the second recess measuring less than each corresponding dimension of the surface in which the second recess is disposed.

* * * * *